Sept. 28, 1937.  A. M. UNGER  2,094,388
ELECTRIC CONTROL SYSTEM
Filed Oct. 11, 1934  2 Sheets-Sheet 1

WITNESSES:
Leon J. Faza
RR Lockwood

INVENTOR
Arthur M. Unger
ATTORNEY

Sept. 28, 1937.          A. M. UNGER          2,094,388
                     ELECTRIC CONTROL SYSTEM
                      Filed Oct. 11, 1934          2 Sheets-Sheet 2

WITNESSES:
Fern J. Faza
R R Lockwood

INVENTOR
Arthur M. Unger
BY
ATTORNEY

Patented Sept. 28, 1937

2,094,388

UNITED STATES PATENT OFFICE 2,094,388

ELECTRIC CONTROL SYSTEM

Arthur M. Unger, Forest Hills, Pa., assignor to Westinghouse Electric & Manufacturing Company, East Pittsburgh, Pa., a corporation of Pennsylvania Application October 11, 1934, Serial No. 747,904

11 Claims. (Cl. 250—27)

My invention relates, generally, to welding apparatus and it has particular relation to resistance welding apparatus.

This invention constitutes an improvement on the invention disclosed in application Serial No. 710,095 of Edwin H. Vedder, filed February 7, 1934, and application Serial No. 728,363 of John W. Dawson, filed May 31, 1934, both of which are assigned to the assignee of this application.

The object of my invention, generally stated, is to provide a control system for resistance welding apparatus which shall be simple and efficient in operation, and which may be readily and economically manufactured and installed.

The principal object of my invention is to provide for controlling the flow of current in a circuit in which the current flow is intermittent.

An important object of my invention is to provide for controlling the flow of current in a resistance welding circuit.

Another object of my invention is to provide for selecting a predetermined number of cycles in which current is permitted to flow in a circuit and maintaining the selection for the remainder of each half cycle.

A further object of my invention is to provide for extending the range of regulation of current flow as controlled by a photo-electric timer mechanism over an entire half cycle.

Other objects of my invention will in part be obvious, and in part appear hereinafter.

My invention, accordingly, is disclosed in the embodiment hereof shown in the accompanying drawings, and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which.

In the application of Vedder, referred to above, a photo-electric timer system is provided for controlling the time when a pair of space discharge devices are rendered conducting. These space discharge devices are interposed between the anodes and starter electrodes of arc discharge devices, which are connected to control the flow of current to a welding transformer. The time when each of the space discharge devices is rendered conducting depends upon the adjustment of the photo-electric system.

In order to provide for a greater degree of accuracy in the operation of the system of Vedder, the system disclosed in the hereinbefore mentioned application of Dawson was provided. According to this system, a second space discharge device is connected in series circuit relation with each of the photo-controlled space discharge devices. The additional space discharge devices are controlled by means of a phase-shifting circuit, which can be accurately adjusted to ignite the arc discharge devices at exactly the time in each half cycle at which it is desired that they be conducting.

The photo-timer disc in the applications of Vedder and Dawson is provided with 120 teeth in its periphery and is arranged to be driven at a speed of one revolution per second by means of a synchronous motor. With this arrangement for each half cycle of the alternating current, one tooth is arranged to intercept the light which falls on the photo-cell. Since the ionizing potential which is applied to the grids of the photo-controlled tubes is generated as a series of impulses, it is desirable to employ this arrangement. Each tooth is arranged to intercept the light for one-fourth of a whole cycle or one-half of a half cycle. The maximum impulsing effect is then provided and the quantity of iron which is required in the impulse transformer is reduced to a minimum.

Figure 3:
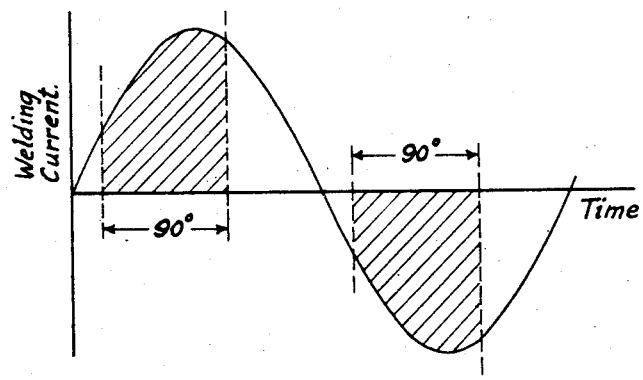
Figs. 3 and 4 show curves which demonstrate the functioning of my invention.
Figure 4:
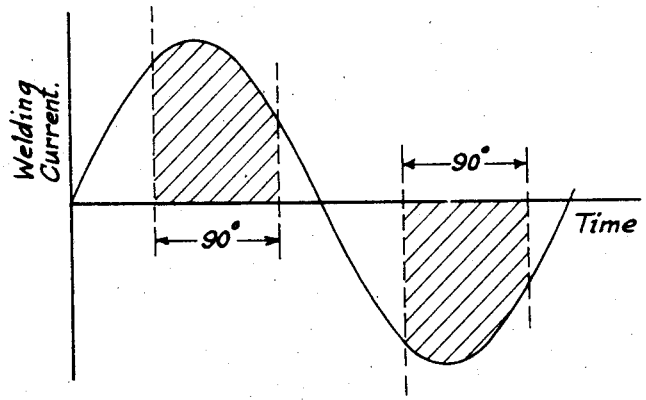

With particular reference to Figs. 3 and 4 of the drawings, it will be observed that the functioning of the systems of Vedder and Dawson is there shown. The cross-hatched areas under the curves in each of these figures represents the time-current relationship in each half cycle during which the photo-timer controlled tubes are conditioned for conduction and during which time they may be rendered conducting provided the phase shift controlled tubes are rendered conducting. In particular, with regard to the series-connected space discharge devices if it is desired to render the arc discharge devices conducting at a time later in each half cycle than that represented by the cross-hatched area, it is necessary to adjust the relative position of the light source with respect to the timer disc so that the cross-hatched area will include the time at which the space discharge devices controlled by means of the phase-shifting circuit are rendered conducting. Thus, if the system is operating as illustrated in Fig. 3 of the drawings, and it is desired to permit the flow of current to the welding circuit at a time which is later than that afforded with this set-up, it is necessary to alter it so that the condition which is illustrated in Fig. 4 of the drawings is obtained.

It will be understood that the amount of current which is provided for performing the welding operation may be adjusted by controlling the time in each half cycle at which current is permitted to flow. Thus, if a large welding current is required, the arc discharge devices are caused to be conducting at a time early in each half cycle. On the other hand, if a small welding current is required, the arc discharge devices may be rendered conducting at a time later in each half cycle. It will, therefore, be understood that the usual taps on the welding transformer or the main transformer which is connected to supply power thereto may be omitted, the entire range of current control being provided by the control system which is arranged to control the operation of the arc discharge devices.

In order to obtain the entire range of current control, it has been necessary in the use of the systems disclosed by Vedder and Dawson, to provide for adjusting the relative position of the light source with respect to the timer-disc. This adjustment is somewhat delicate and requires a certain time for the operator to perform. In addition, in certain instances, it cannot be made with a high degree of accuracy and a certain amount of experimenting is necessary in order to obtain the correct adjustment.

According to my invention, I have provided for obviating the necessity of adjusting the relative position of the light source with respect to the photo-timer disc. After a selection of any particular half cycle has been made by the photo-timer mechanism, the selection is maintained until the end of that particular half cycle. It is thus possible to initially adjust the photo-timer so that the space discharge devices controlled thereby will be rendered conducting at the beginning of each half cycle, during which it is desired that they be conducting. It is unnecessary to shift this adjustment in order to control the operation of the arc discharge devices at a time later than the mid-point of each half cycle.

In order to effect this functioning, I have provided a resistor in shunt circuit relation with each of the space discharge devices which is controlled by means of the phase-shifting circuit. It will be understood that a resistor is connected in series circuit relation with each of the space discharge devices which are controlled by means of the photo-timer circuit. After the latter space discharge devices have once been rendered conducting, sufficient current is permitted to flow through the resistors as will maintain the space discharge devices in the ionized condition for the remainder of each half cycle. However, the amount of current which is permitted to flow is not sufficient to ignite the arc discharge devices. It is necessary to render the phase control space discharge devices conducting before sufficient current will be permitted to flow to ignite the arc discharge devices.

Figure 1:
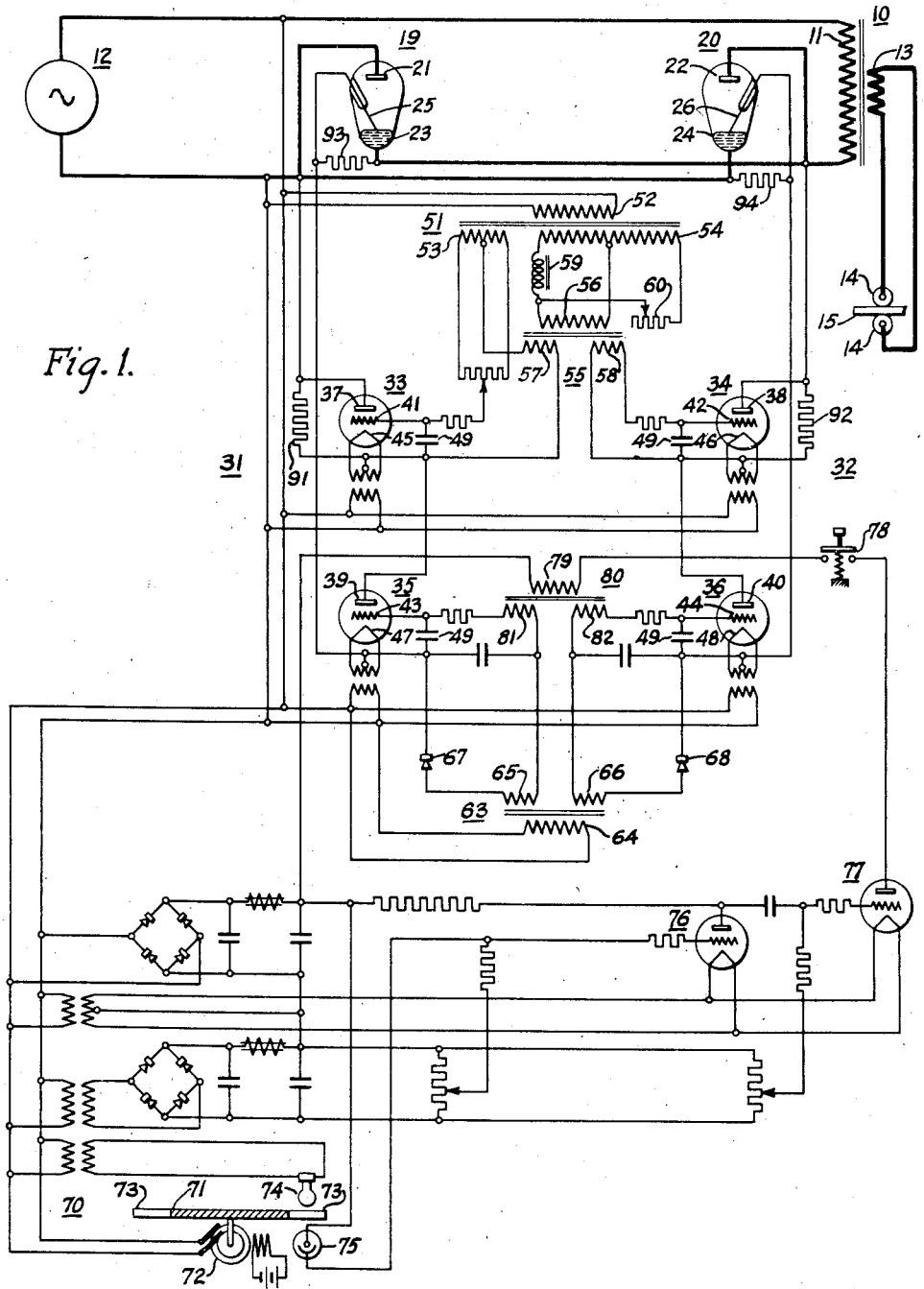
Figure 1 illustrates, diagrammatically, a control system organized in accordance with my invention.

Referring now particularly to Fig. 1 of the drawings, the reference character 10 designates, generally, a welding transformer having a primary winding 11, which is connected to be energized from a source of alternating current 12, which may be a 60-cycle generator. The welding transformer 10 is also provided with a secondary winding 13 which is connected to supply current to a welding circuit including electrodes 14 between which work 15, on which a welding operation is to be performed, may be placed. The welding electrodes 14 are illustrated in the drawings as being in the form of rollers. However, it will be understood that any other suitable type of welding electrodes may be used without departing from the scope of this invention.

In order to control the flow of welding current to the welding circuit, a pair of inversely connected arc discharge devices, shown generally at 19 and 20, is provided and is connected between the primary winding 11 of the welding transformer 10 and the alternating-current source 12. Each of the arc discharge devices 19 and 20 comprises, respectively, anodes 21 and 22, mercury pool cathodes 23 and 24, and control electrodes 25 and 26. When current is caused to flow through the control electrodes 25 and 26 into the mercury pool cathodes 23 and 24, cathode spots are formed on the cathodes which will cause the arc discharge devices 19 and 20 to become conducting when thus ignited, provided that the proper polarity for which they are adapted to be conducting is applied thereto. In other words, each of the arc discharge devices 19 and 20, will become conducting on the application of the proper polarity or half cycle thereto provided that the cathode spot is formed in the half cycle for which either of them is adapted to become conducting. The arc discharge devices 19 and 20 will remain in the conducting state until the end of a half-cycle and will not again become conducting unless in a succeeding half cycle the cathode spot is formed as described herein.

In order to energize the control electrodes 25 and 26 for the purpose of forming the cathode spots in the arc discharge devices 19 and 20, control circuits, shown generally at 31 and 32, are provided. The circuits 31 and 32 comprise space discharge devices 33 and 34, respectively, which are controlled by means of a phase-shifting circuit, and also space discharge devices 35 and 36, which are disposed to be controlled by means of a photo-timer circuit. As illustrated, each of the space discharge devices 33, 34, 35 and 36 is provided, respectively, with anodes 37, 38, 39 and 40, grids 41, 42, 43 and 44, and hot cathodes 45, 46, 47 and 48.

As illustrated, a capacitor 49 is connected between each of the grids 41, 42, 43 and 44 and its respective cathode 45, 46, 47 and 48, in order to maintain the former at a predetermined potential relative to the latter.

As set forth hereinbefore, the space discharge devices 33 and 34 are controlled by means of a phase-shifting circuit. This circuit is energized by means of a phase-shifting transformer shown generally at 51, and comprising a primary winding 52 which is connected for energization to the alternating current source 12 and secondary windings 53 and 54. A phase-shift grid transformer 55 is provided having a primary winding 56 which is disposed to be energized from the secondary winding 54. The phase-shift grid transformer 55 is provided with secondary windings 57 and 58, which are connected respectively to the grids 41 and 42 of the space discharge devices 33 and 34 for applying thereto the proper energizing potential.

It will be observed that the primary winding 56 of the grid transformer 55 is connected to the secondary winding 54 through a phase-shifting network comprising an inductor 59 and an adjustable resistor 60. The times at which the grids 41 and 42 have applied thereto the proper energizing potential will depend upon the adjustment of the resistor 60, as will be readily understood.

Since it is not ordinarily desirable to have the arc discharge devices 19 and 20 conducting during each successive half cycle, but rather to have them conducting for a predetermined number of half cycles, and non-conducting for a predetermined number of half cycles, the space discharge devices 35 and 36 are provided for effecting this operation. When the devices 35 and 36 are rendered conducting the circuit is completed between the anodes 21 and 22 and the cathodes 23 and 24 of the arc discharge devices 19 and 20, respectively, through the control electrodes 25 and 26, so that the cathode spots described hereinbefore will be formed to render the arc discharge devices 19 and 20 conducting.

In order to maintain the space discharge devices 35 and 36 in the non-conducting state, a transformer shown generally at 63, is provided, having a primary winding 64 connected for energization to the source 12, and secondary windings 65 and 66. The secondary windings 65 and 66 are connected, respectively, through rectifiers 67 and 68 to the grids 43 and 44, so that the indicated negative potentials may be applied thereto for maintaining the space discharge devices 35 and 36 in the non-conducting state.

Figure 2:
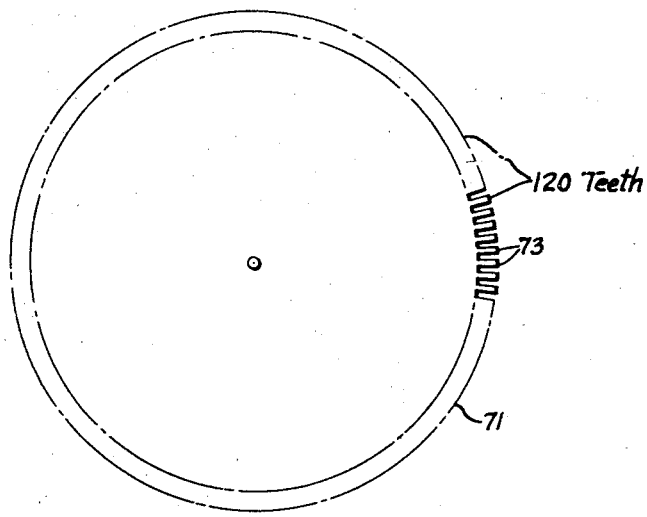
Fig. 2 is a top plan view of the timer disc which is provided as a part of the photo-timer mechanism.

The negative potential which is normally applied to the grids 43 and 44 is overcome at predetermined times by means of a photo-timer system, which is generally shown at 70. The photo-timer system 70 comprises a disc 71 which is arranged to be rotated by means of a synchronous motor 72. As illustrated more clearly in Fig. 2 of the drawings, the disc 71 is provided with 120 teeth 73 in the periphery thereof. The teeth 73 are arranged to intercept the light rays from a light source 74 as they fall on a photoelectric cell 75.

The photo-electric cell 75 is connected to an amplifier tube, shown generally at 76, the output of which is applied to a timer control tube 77 in the form of impulses. As illustrated, the timer control tube 77 is arranged to be connected by means of a push-button switch 78 to the primary winding 79 of an impulse transformer, shown generally at 80. The impulse transformer 80 is provided with secondary windings 81 and 82, which are connected, respectively, to the grids 43 and 44. The impulses which are applied to the secondary windings 81 and 82 and to the grids 43 and 44, are of such polarity as to overcome the negative ionizing potential which is normally applied thereto, and further, to provide a positive ionizing potential to the grids. When the positive ionizing potential is applied to the grids 43 and 44, the space discharge devices 35 and 36 are rendered conducting.

As set forth hereinbefore, in order to obtain the maximum effect of the impulses which are provided by the photo-timer system 70, the space discharge devices 35 and 36 would ordinarily be rendered conducting only during one-fourth of a cycle of the alternating current. In order to extend the range of control afforded by the photo-timer system 70, resistors 91 and 92 are provided and are connected in shunt circuit relation with the phase-shift control space discharge devices 33 and 34. It will be understood that the resistors 91 and 92 are connected respectively, in series circuit relation with the space discharge devices 35 and 36.

The ohmic values of the resistors 91 and 92 are so chosen that sufficient current is permitted to flow therethrough to maintain the space discharge devices 35 and 36 in the ionized condition for the remainder of each half cycle in which they have been rendered conducting. However, sufficient current is not permitted to flow to form the cathode spots on the cathodes 23 and 24 and thus render the arc discharge devices 19 and 20 conducting.

In order to obtain more stable operation of the arc discharge devices 19 and 20 it is desirable to provide the resistors 93 and 94 connected respectively in shunt circuit relation with the control electrode 25 and the cathode 23 of the arc discharge device 19 and with the control electrode 26 and cathode 24 of the arc discharge device 20. The resistors 93 and 94 are effective to reduce the heating of the control electrodes 25 and 26 and also to provide a definite limiting value of resistance in shunt circuit relation therewith.

It is necessary for the space discharge devices 33 and 34 to be rendered conducting by means of the phase-shifting circuit before the cathode spots are formed. It will then be observed that the range of control for the arc discharge devices 19 and 20 has been extended over an entire half cycle. The space discharge devices 35 and 36, in combination with the photo-timer system 70, control the particular half cycles during which it is desired that the arc discharge devices 19 and 20 permit the flow of current. The particular time in each half cycle at which current is permitted to flow to the welding circuit is controlled by means of the space discharge devices 33 and 34 and the associated phase-shifting system.

Since certain further modifications of this invention may be made without departing from the scope thereof, it is intended that all matter shown in the accompanying drawings, or described in the specification, be considered as illustrative, and not in a limiting sense.

I claim as my invention:

1. An electric power system comprising, in combination, a load circuit, circuit means connecting the load circuit to a source of alternating current, electric discharge means connected to control the flow of current to said load circuit, means functioning to restrain said discharge means from being conductive except during fractions of a predetermined number of half cycles of the alternating current, means cooperative with the last said means to prevent said restraining means from functioning during the remaining portion of each half cycle in which said discharge means is permitted to be conductive, and means for rendering said discharge means conducting at a predetermined time in each of said half cycles of the alternating current.

2. An electric power system comprising, in combination, a load circuit, circuit means connecting the load circuit to a source of alternating current, electric discharge means connected to control the flow of current to said load circuit, and control means for rendering said discharge means conducting during a predetermined number of half cycles of the alternating current comprising means for selecting a predetermined number of said half cycles during a fraction of which said discharge means is permitted to be conductive, means cooperative with said selecting means for permitting said discharge means to be conductive during the remainder of each said half cycles during which it is permitted to be conductive by said selective means and means cooperating with said selecting means for rendering said discharge means conducting at a predetermined time in each of said half cycles.

3. An electric power system comprising, in combination, a load circuit, circuit means connecting the load circuit to a source of alternating current, electric discharge means connected to control the flow of current to said load circuit, space discharge means connected to restrain said electric discharge means from conducting except for a predetermined period, less than a half period of said source, in a predetermined number of half cycles of the alternating current, means cooperative with said space discharge means for extending said period during which said discharge means is permitted to be conductive to the end of each of the corresponding half cycles, and means cooperating with said space discharge means for rendering said electric discharge means conducting at a predetermined time in each of said half cycles.

4. An electric power system comprising, in combination, a load circuit, circuit means connecting the load circuit to a source of alternating current, electric disharge means connected to control the flow of current to said load circuit, a pair of space discharge devices connected in series circuit relation and disposed when both are rendered conducting to effect the ignition of said electric discharge means to permit the flow of load current, means for restraining one of said space discharge devices from becoming conducting except for a predetermined interval in each of a predetermined number of half cycles of the alternating current, means for permitting said one space discharge device to conduct a current which is insufficient to effect ignition of said electric discharge means when said other space discharge device is non-conductive, and means for rendering the other space discharge device conducting at a predetermined time in each of said half cycles.

5. An electric power system comprising, in combination, a load circuit, circuit means for connecting the load circuit to a source of alternating current, a pair of inversely connected electric discharge devices connected to control the flow of current to said load circuit, a control electrode in each electric discharge device, control means for restraining the energization of said control electrodes except for a predetermined interval in each of a predetermined number of half cycles of the alternating current, said control means being operative to permit energization of said control electrode during said predetermined intervals, means for maintaining said control means so operative to permit energization of said control electrode during the remainder of each of said half cycles in which said control means is operative, and additional control means disposed to energize said control electrodes at a predetermined instant in any of said half cycles, thereby rendering said electric discharge devices conducting during a predetermined number of half cycles beginning at a predetermined time in each half cycle.

6. An electric power system comprising, in combination, a load circuit, circuit means for connecting the load circuit to a source of alternating current, a pair of inversely connected electric discharge devices connected to control the flow of current to said load circuit, a control electrode in each discharge device, and a control means for rendering said discharge devices conducting during a predetermined number of half cycles of the alternating current comprising means functioning to restrain said discharge devices from being conductive except for a predetermined portion of a certain number of related half cycles, means cooperative with said restraining means for maintaining said discharge devices capable of conducting until the termination of each half cycle, and means cooperating with said control means for rendering said discharge devices conducting at a predetermined time in each of said half cycles.

7. An electric power system comprising, in combination, a load circuit, circuit means for connecting the load circuit to a source of alternating current, a pair of inversely connected electric discharge devices connected to control the flow of current in said load circuit, a control electrode in each discharge device, space discharge means connected to be effective for energizing said electrodes for a predetermined period, less than a half period of said source, in a predetermined number of half cycles of the alternating current, means for extending said period to the end of each of said half cycles, and means cooperating with said space discharge means for energizing said electrodes at a predetermined time in each of said half cycles.

8. An electric power system comprising, in combination, a load circuit, circuit means for connecting the load circuit to a source of alternating current, a pair of inversely connected electric discharge devices connected to control the flow of current to said load circuit, a control electrode in each electric discharge device, a pair of space discharge devices connected in series circuit relation to each of said control electrodes and disposed when the devices of each pair are rendered conducting to energize the control electrode individual thereto thereby rendering the arc discharge devices conducting to permit the flow of load current, means for sequentially rendering the space discharge devices of each pair conducting in a predetermined number of half cycles of the alternating current, and means for maintaining the first of said space discharge devices of each pair to be rendered conductive in the conducting state, such that it passes insufficient current to energize the corresponding electric discharge device, when the other discharge device of each pair is non-conductive, until the termination of each half cycle.

9. An electric power system comprising, in combination, a load circuit, circuit means for connecting the load circuit to a source of alternating current, a pair of inversely connected electric discharge devices connected to control the flow of current to said load circuit, a control electrode in each electric discharge device, a pair of space discharge devices connected in series circuit relation and to each control electrode to effect the ignition of said arc discharge devices to permit the flow of load current, means for restraining one of said space discharge devices of each pair from conducting except during a portion of each of a predetermined number of half cycles of the alternating current, means for maintaining said one space discharge device of each pair conducting during the remaining portion of each of said half cycles, to such an extent that it passes insufficient current to ignite the corresponding electric discharge device when said other discharge device of each pair is non-conductive, and means for rendering the other space discharge device of each pair conducting at a predetermined time in each of said half cycles.

10. An electric power system comprising, in combination, a load circuit, circuit means for connecting the load circuit to a source of alternating current, a pair of inversely connected electric discharge devices connected to control the flow of current in said load circuit, a control electrode in each electric discharge device, a pair of space discharge devices connected in series circuit relation to each of said control electrodes and disposed when the devices of each pair are rendered conducting to energize the control electrode individual thereto, thereby rendering the electric discharge devices conducting to permit the flow of load current, means connected to restrain one of said space discharge devices of each pair from becoming conductive except for a predetermined period in a predetermined number of half cycles of the alternating current, a resistor connected in shunt circuit relation with the other space discharge device of each pair for maintaining said one space discharge device of each pair conducting for the remainder of each half cycle after it has been rendered conducting, while the other discharge device is non-conductive, said resistor being of such magnitude that the current transmitted while said other discharge device is non-conductive is insufficient to energize the corresponding control electrode, and means for rendering the other space discharge device of each pair conducting at a predetermined time in each of said half cycles.

11. An electric power system comprising, in combination, a load circuit, circuit means connecting the load circuit to a source of alternating current, means connected to control the flow of current to said load circuit, means functioning to restrain said control means from permitting the flow of current to said load except during fractions of a predetermined number of half cycles of the alternating current, means cooperative with the last said means to prevent said restraining means from functioning during the remaining portion of each half-cycle in which said control means permits the flow of current and means for causing said control means to permit the passage of current at a predetermined instant in each half-cycle of the alternating current.

ARTHUR M. UNGER.